US008454742B2

(12) United States Patent
Scanlan

(10) Patent No.: US 8,454,742 B2
(45) Date of Patent: Jun. 4, 2013

(54) ARTIFICIAL STONE AND METHOD OF MAKING SAME

(76) Inventor: Tom Scanlan, Jeffersonville, IN (US)

( * ) Notice: Subject to any disclaimer, the term of this patent is extended or adjusted under 35 U.S.C. 154(b) by 171 days.

(21) Appl. No.: 12/834,555

(22) Filed: Jul. 12, 2010

(65) Prior Publication Data

US 2012/0006232 A1    Jan. 12, 2012

(51) Int. Cl.
*C04B 14/00* (2006.01)

(52) U.S. Cl.
USPC .......... 106/400; 106/819; 106/820; 106/38.2; 106/638; 106/672; 106/676; 106/711; 106/712; 106/713; 106/716; 52/506.01; 52/506.05

(58) Field of Classification Search
USPC ............... 106/400, 819, 820, 38.2, 638, 672, 106/676, 711, 712, 713, 716
See application file for complete search history.

(56) References Cited

U.S. PATENT DOCUMENTS

| 415,772 | A |   | 11/1889 | Fiske |   |
|---|---|---|---|---|---|
| 1,857,995 | A |   | 5/1932 | Alles et al. |   |
| 2,577,215 | A |   | 12/1951 | Smith et al. |   |
| 3,524,790 | A |   | 8/1970 | Mason |   |
| 4,043,826 | A |   | 8/1977 | Hum |   |
| 4,306,395 | A |   | 12/1981 | Carpenter |   |
| 4,734,322 | A | * | 3/1988 | Favre | 428/312.6 |
| 5,535,563 | A |   | 7/1996 | Brown et al. |   |
| 6,132,820 | A |   | 10/2000 | Callahan |   |
| 6,296,699 | B1 |   | 10/2001 | Jin |   |
| 6,355,193 | B1 |   | 3/2002 | Stott |   |
| 6,616,752 | B1 |   | 9/2003 | Basura et al. |   |
| 7,489,984 | B2 |   | 2/2009 | Jackman et al. |   |
| 7,774,091 | B2 |   | 8/2010 | Jackman |   |
| 2002/0106504 | A1 |   | 8/2002 | Stott |   |
| 2003/0087046 | A1 |   | 5/2003 | Carpenter |   |
| 2003/0200713 | A1 |   | 10/2003 | McStay |   |
| 2004/0006943 | A1 |   | 1/2004 | Weick |   |

(Continued)

FOREIGN PATENT DOCUMENTS

| CN | 101508593 A | * | 8/2009 |
| JP | 11081624 |   | 3/1999 |

OTHER PUBLICATIONS

Camillo, Jim, Device Duplicates Stone Shapes. (new products)., Masonry Construction, Cepco Tool Co., Spencer, NY, Oct. 1, 2002.

(Continued)

*Primary Examiner* — Melvin C Mayes
*Assistant Examiner* — Melissa Stalder
(74) *Attorney, Agent, or Firm* — Middleton Reutlinger; James E. Cole

(57) ABSTRACT

A lightweight artificial stone system comprises a plurality of artificial stones, each of the artificial stones formed of at least some portion of cement, expanded glass, and styrene, the lightweight artificial stones having a density in the range of between about 30 and 70 pounds per cubic foot, each of the stones having six sides and including a first height dimension and a second width dimension, each of the height and width dimensions having a length unit being substantially a multiple of two, each of the stones having four ninety degrees corners and four of the six sides having a smooth surface to provide tight, cement-free seams between adjacent stones, the tight, cement-free seams inhibiting viewing of structure behind said plurality of artificial stones, each of the stones being of such a light weight so as to be held in position in the system by a lath-less and cement-free adhesive.

7 Claims, 14 Drawing Sheets

U.S. PATENT DOCUMENTS

| | | | |
|---|---|---|---|
| 2005/0087908 | A1 | 4/2005 | Nasr et al. |
| 2005/0217175 | A1 | 10/2005 | Leone et al. |
| 2005/0229500 | A1 | 10/2005 | Howard |
| 2005/0252144 | A1 | 11/2005 | MacDonald et al. |
| 2006/0156668 | A1 | 7/2006 | Nasvik |
| 2006/0217464 | A1* | 9/2006 | Guevara et al. .................. 524/2 |
| 2006/0260230 | A1 | 11/2006 | LeBlanc et al. |
| 2007/0130860 | A1* | 6/2007 | Paquette et al. ............. 52/311.1 |
| 2008/0095584 | A1 | 4/2008 | Strand et al. |
| 2008/0110116 | A1 | 5/2008 | Brown et al. |
| 2008/0275149 | A1* | 11/2008 | Ladely et al. .................. 521/55 |
| 2008/0313988 | A1 | 12/2008 | MacDonald |
| 2009/0056257 | A1 | 3/2009 | Mollinger et al. |
| 2009/0126301 | A1 | 5/2009 | Brown et al. |
| 2010/0197182 | A1* | 8/2010 | Barzilai .......................... 442/1 |

OTHER PUBLICATIONS

Korean Intellectual Property Office, Notification of Transmittal of the International Search Report and the Written Opinion of the International Searching Authority, or the Declaration, Search Report and Written Opinion, Feb. 9, 2012, pp. 1-12, Korean Intellectual Property Office, Republic of Korea.

* cited by examiner

ARTIFICIAL STONE AND METHOD OF MAKING SAME

CROSS-REFERENCE TO RELATED DOCUMENTS

None

TECHNICAL FIELD

This invention pertains to an artificial lightweight stone. More specifically, the present invention relates to a stone system of artificial stone blocks each formed of cement and at least one of expanded polystyrene or expanded glass wherein the artificial stone blocks may be positioned over a wall or panel without requiring traditional preparation work utilized by prior art stone and manmade stone structures and a method of making same.

BACKGROUND

Traditional stone or manmade stone walls are assembled together in the shape of a wall and typically held together with mortar by grouting. A wall behind the stone also typically requires a lath material which must be coated with mortar as well. The mortar and lath materials are required due to the weight of the stone or manmade stone which ultimately adds expense and time to jobs.

Various attempts have been made to use manmade materials which are less expensive and require less labor. Some materials are formed in preformed sheet like structures which are applied to a wall desired to have a stone like faced. However, these preformed sheets or structures do not allow for variation of dimension of the wall. Alternatively stated, these preformed sheets limit dimensional changes of a wall only to some dimension which is a multiple of the base dimension of a single sheet unit.

Other designs have been used, such as stamped concrete or textured concrete. However, concrete material is extremely heavy and therefore requires additional structure to support the weight of such concrete. Other materials have been formed in an attempt to provide a rock or stone like appearance, however such materials do not appear completely realistic and therefore have not been widely accepted.

It would be desirable to overcome these and other deficiencies known in the prior art and provide a lightweight stone like material which does not require the use of a lath and mortar material to support the weight of the stone. It would also be desirable to provide a material which may be formed in various dimensions, so that walls of any size may be formed with only minimal cutting of the stones required.

SUMMARY

A lightweight artificial stone system for indoor use, comprises a plurality of artificial stones, each of the artificial stones formed of at least some portion of cement, expanded glass, and styrene, said lightweight artificial stones having a density in the range of between about 30 and 70 pounds per cubic foot, each of the stones having six sides and including a first height dimension and a second width dimension, each of the height and width dimensions having a length unit being substantially a multiple of two, each of the stones having four ninety degrees corners and four of the six sides having a smooth surface to provide tight, cement-free seams between adjacent stones, the tight, cement-free seams being substantially free of gaps and inhibiting viewing of structure behind the plurality of artificial stones, each of the stones being of such a light weight so as to be held in position in said system by a lath-less and cement-free adhesive. The lightweight artificial stone system further comprising a cement-free adhesive disposed on at least one of rear surfaces of the stones or the structure behind the plurality of artificial stones. The lightweight artificial stone system wherein the front surfaces of the stones are contoured and textured to provide the appearance of natural stone. The lightweight artificial stone system wherein the rear surface is substantially flat. The lightweight artificial stone system wherein the rear surface is textured to aid adhesion of the stone.

A lightweight artificial stone system for indoor, comprises a plurality of molded artificial stones, each of the stones formed of a first amount of cement and a second amount of expanded glass, each of the molded stones having six sides including at least one height dimension, at least one width dimension, and at least one depth dimension, the at least one width having a dimension which is a multiple of two units, the molded stones having at least four corners which are each about 90 degrees and smooth side surfaces which allow for flush butting an adjacent stone with seams of between about 1/64 inch and 1/8 inch, a cement-less fixative disposed on at least a rear surface to retain the stones on a substrate supports the system, the molded stones having a plurality of edges extending in a depth direction wherein the edges are substantially right angles, the side surfaces extending between the edges, the stones having a density range of between about 30 and 70 pounds per cubic foot. The lightweight artificial stone system further comprising the cement-free fixative disposed between the molded stones. The lightweight artificial stone system wherein the at least one depth dimension is greater than about one-quarter inch (¼"). The lightweight artificial stone system wherein the at least one depth dimension is less than about two (2") inches. The lightweight artificial stone system wherein the molded stones have a density of about less than 40 pounds per cubic foot. The lightweight artificial stone system wherein the substrate is lath-less. The lightweight artificial stone system wherein front surfaces of the molded stones are contoured and textured to provide a natural stone appearance. The lightweight artificial stone system wherein rear surfaces of the molded stones are substantially flat and textured. The lightweight artificial stone system wherein each of the artificial molded stones are molded to a dimensionally accurate size for use with the artificial stone system.

A method of forming lightweight artificial stone which is dry stackable, comprises one of cutting a rock to first desired dimensions and cutting a smooth rear surface, the other of cutting a rock to first desired dimensions and cutting a smooth rear surface, re-squaring the rock at least once, laying out at least one of the rock for molding, covering the at least one rock in a mold forming material, forming a mold which accommodates for shrinkage of a cement and expanded glass mixture, filling the mold with the cement and expanded glass mixture, forming at least one artificial stone with the mold, comparing at least one dimension of the at least one artificial stone with a target dimension. The method further comprising recutting the rock and forming a second mold. The method further comprising forming a second artificial stone and comparing at one dimension of the second artificial stone with the target dimension. The method further comprising placing a relief in the mold to aid removal of the dimensionally accurate artificial stone. The method further comprising removing the at least one dimensionally accurate artificial stone from the mold. The method further comprising filling the mold with coloring. The method wherein the dimensionally accurate artificial stone has four smooth surfaces and four right angle corners. The method wherein the dimensionally accurate artificial stone has at least one dimension of preselected length.

A method of forming a lightweight artificial stone comprises sizing an existing rock to a first set of dimensions and compensating for shrinkage of moldable cement and expanded glass mixture, squaring the existing rock at least once, laying out at least one of the existing rock, forming a mold of the existing rock, removing the existing rock from the mold, filling the mold with the moldable cement and expanded glass mixture, forming at least one dimensionally accurate stone. The method further comprising a styrene, wherein the styrene is recycled. The method further comprising a styrene, wherein the styrene is virgin material. The method further comprising re-squaring the existing rock.

An artificial stone comprises a relatively lightweight molded stone having an appearance of a natural rock on at least one surface, the molded stone being formed of cement being between about 60-90% by weight and, expanded glass being about 20-39% by weight. The artificial stone further comprising a plasticizer being less than about 5% by weight. The artificial stone further comprising an accelerator being less than about 5% by weight. The artificial stone of Claim 13 further comprising styrene. The artificial stone wherein the styrene is less than about 5% by weight. The artificial stone further comprising pigments. The artificial stone wherein the pigments are less than about 1% by weight. The artificial stone wherein the artificial stone has a density being less than about 40 pounds per cubic foot.

An artificial stone, comprises a relatively lightweight molded stone having an appearance of a natural rock on at least one surface, the molded stone being formed of cement being between about 60-90% by weight, expanded glass being about 20-39% by weight, the expanded glass being a plurality of beads generally spherical in shape, the beads having diameter size ranges of: about 10-30% being about 0.25-0.5 mm in diameter; about 10-30% being about 0.5-1 mm in diameter, about 14-34% being about 1-2 mm in diameter, and about 25-45% being about 2-6 mm in diameter.

BRIEF DESCRIPTION OF THE ILLUSTRATIONS

Embodiments of the invention are illustrated in the following illustrations.

DETAILED DESCRIPTION

Figure 1:
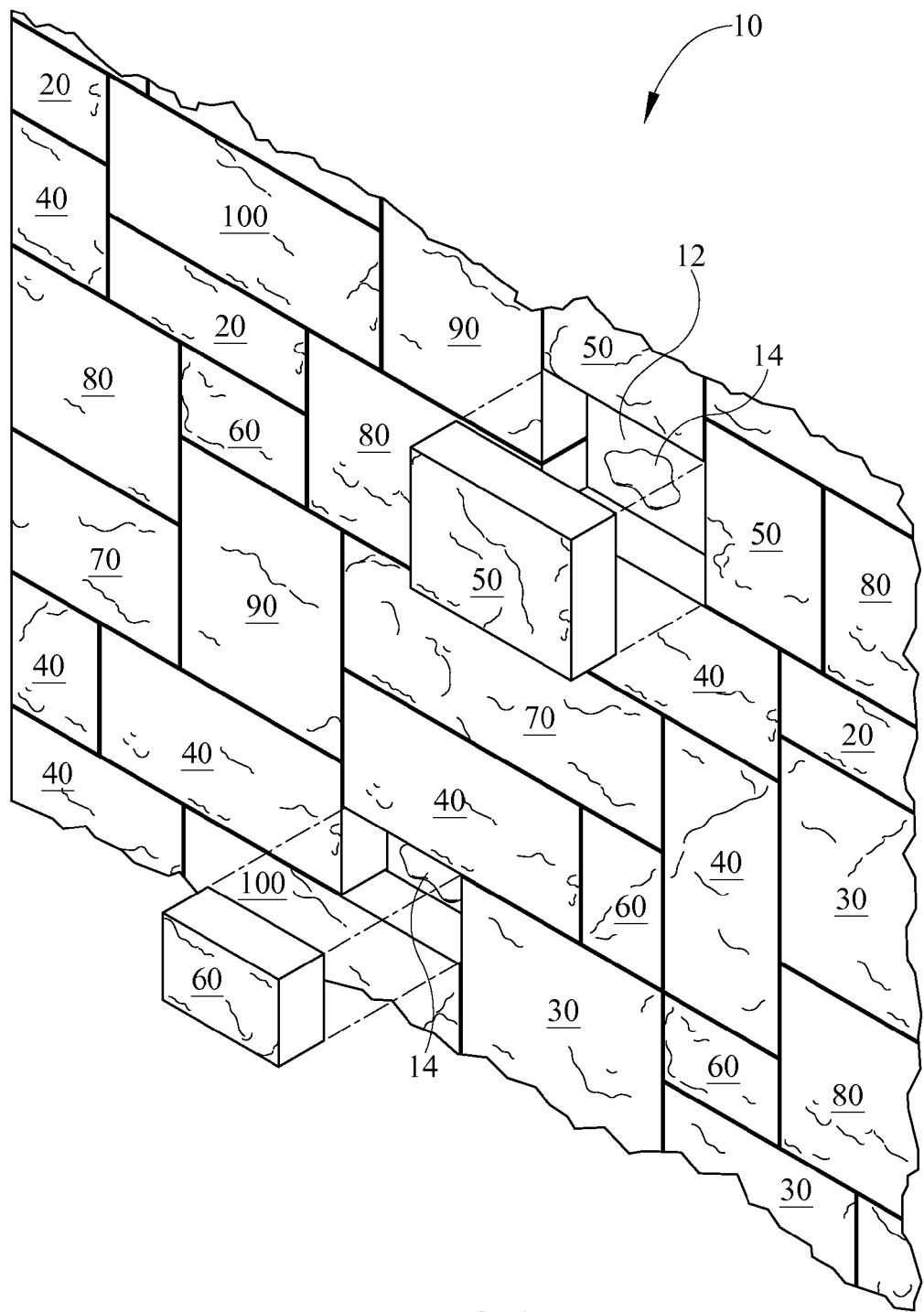
FIG. 1 is a perspective view of a wall formed of artificial lightweight stone.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

A plurality of artificial stones defining a stone wall system is shown in the various FIGS. 1-14. A method of making the artificial stones defining the system is also shown as well as compositions defining the stones. The stones each comprise four right angle corners and smooth sidewalls so that the stone wall system may be formed in a dry or flat stacked arrangement so that any gaps between stones are minimized, without the need for mortar to hold the stones on the wall, when used indoors, or mortar to fill gaps. The artificial stones, and veneer collectively, are formed with cement and at least one of polystyrene or expanded glass in order to form a lightweight stone which does not require a lath and mortar to hold the artificial stones to a wall or substrate. Thus, the lightweight artificial stone is capable of being installed by without the need of a professional mason. Alternatively stated, the artificial stone may be easily installed by a do-it-yourselfer.

Referring initially to FIG. 1, an artificial lightweight stone wall 10 is shown. The stone wall or veneer 10 is formed of a plurality of individual stones. With respect to this disclosure, the term stone or block is meant to include artificial stones or blocks. Each of the stones are formed having at least two preselected dimensions so as to provide a system requiring minimal cutting to cover wall structures of various sizes while providing a straight edge at ends of the wall. The artificial stone may be formed of cement, water and at least one of styrene or expanded glass. Additionally, the individual stones may include an natural or manufactured aggregate such as, without limitation, concrete, sand, expanded clay, shale, slate, sintered fly ash, perilite, vermiculite, pumice, scoria, tuff, or other filler materials, components or composites. The styrene may comprise, without limitation, styrene, polystyrene, and expanded polystyrene (EPS) to provide a lightweight artificial stone which is capable of being mounted on a wall structure without the necessity of a lath or mortar. The expanded glass may be porous glass spheres or micro-cell glass spheres made from 99.997% pure glass from, for example, recycled sources. Alternatively, the expanded glass may come in other forms including beads, shards, three-dimensional polygons or other shapes, and may be utilized with or without the styrene. Due to the molding of dimensionally accurate stones, and the use of a dimensional system, the stones may be closely spaced, substantially without gaps, in a fashion not requiring mortar between the stones.

The figure depicts artificial stone wall 10 formed of a plurality of stones 20, 30, 40, 50, 60 and 70, with at least one of the stones exploded from the wall 10 to reveal a substrate wall 12 behind the artificial stone wall 10. Behind the exploded stones 50 and 60, an adhesive 14 is disposed which is utilized to adhere the stones to the substrate 12. When the wall is constructed indoors, the adhesive is some cement-free type of adhesive or fixative. For example, the fixative material commercially referred to as "Liquid Nail" may be utilized. Alternatively, acrylic-based, silicone-based or other pre-mixed adhesives may be utilized. However, such adhesives should not be considered limiting as any cement-free pre-mixed adhesive or fixative may be utilized. In a further alternative, if the wall is positioned on an outside surface, it may be desirable to utilized a cement based adhesive since the destructive effects of ultra-violet light will not cause degradation of the cement based mortar or adhesive. Additionally, if utilized outside, since a cement based adhesive or a mortar are utilized, the construction may or may not also require a lath. In a further alternative, when utilized to form an exterior surface, a fixative may also be disposed between the stones to seal any spaces between stones so that rain or other weather elements are inhibited from accessing the substrate behind the artificial stones. Whether used interiorly or exteriorly, the rear surface of the artificial stones may be smooth surfaced or may be slightly textured to improve adherence of the stones to the substrate 12. The stones are formed of a series of sizes which provide various advantages. First, the stones are dimensioned to provide a straight line along outer edges of the artificial stone wall 10 thereby minimizing cutting of the stones. Second, the stones are individually formed with straight edges and smooth surfaces allowing tight placement of adjacent stones. Further, the dimensional accuracy of the molded stone provides that no cement-based adhesive is required between adjacent stones when installed indoors. Additionally, due to lightweight composition of the stones, the stones may be applied to the substrate wall 12 without the need for use of a mortar or cement-based material. Instead, a lightweight fixative, for example a pre-mixed fixative, may be used which allows for easier installation. The substrate 12 may be formed of drywall, plywood, MDF, rigid insulation boards, other known planar structures common with building or other materials which may cover the planar structures.

The stones 20, 30, 40, 50, 60 and 70 are depicted laid in a castle block pattern wherein the longest dimension of the each stone may either be oriented in a vertical or horizontal orientation. Various numbers of differing sized blocks may be utilized to form the castle block pattern, however the block sizes are limited dimensionally to meet the desired characteristic of providing straight boundary edges for the wall 10, as shown at the left hand side of wall 10, and also minimizing the necessity to cut blocks. Several exemplary blocks are shown in FIG. 2-5 but should not be considered limiting as various numbers of blocks may be formed.

Figure 2:
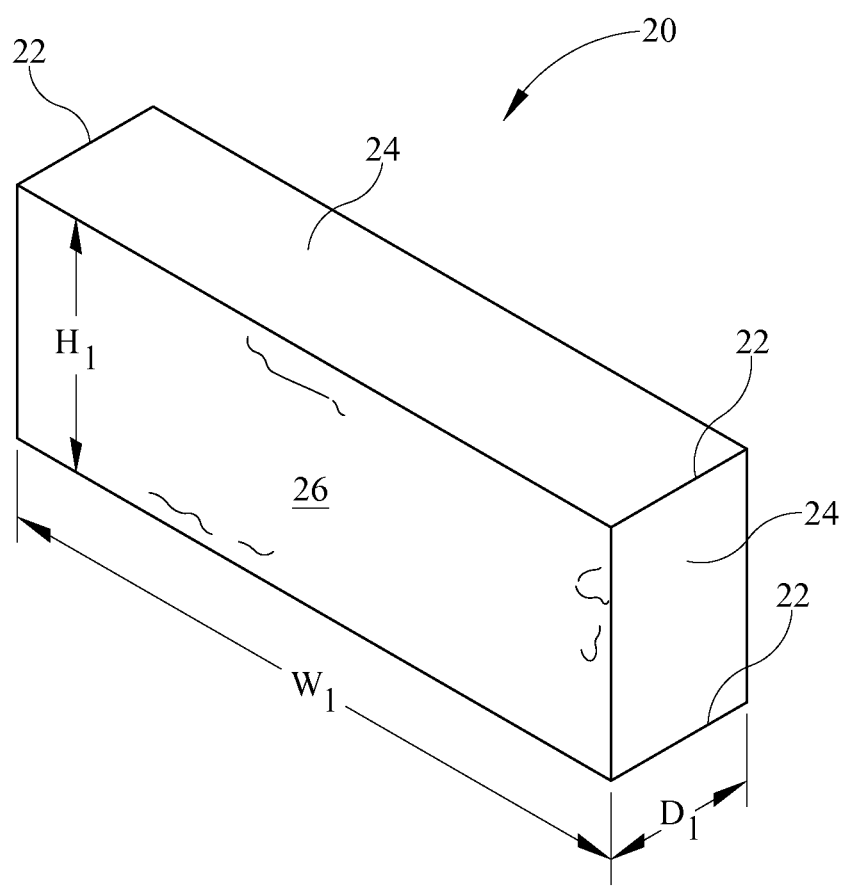
FIG. 2 is a perspective view of a first exemplary artificial lightweight stone.

In order to provide this straight boundary edge, the stones 20, 30, 40, 50, 60, and 70 are each provided with dimensional relationships. Each of the stones 20, 30, 40, 50, 60 and 70 defining the wall 10 are depicted in FIGS. 2-7 with dimensional descriptions. Referring first to FIG. 2, the stone 20 has a height ($H_1$), a width ($W_1$) and depth ($D_1$) dimension. The height dimension is measured generally in a direction perpendicular to the floor and parallel to substrate 12 (FIG. 1). The width dimension is measured in a direction which is substantially parallel to the floor and parallel to the substrate 12 (FIG. 1). The depth dimension is measured in a direction which is generally parallel to the floor and perpendicular to substrate 12 (FIG. 1). Each of the height and width dimensions are either a base number, for example two, or an integer multiple of that base number. For example, the height ($H_1$) may be two inches (2") or the height may be 4". Similarly, the width ($W_1$) may also be a base number, or some integer multiple of that base number. The use of a base number and an integer multiple provides that the stones may be arranged to provide a wall 10 having a dimensional border with a substantially straight line. Further, the use of the stone 20 as the base dimension is merely exemplary as any one or more of the stones used in the system may serve to provide the base dimension upon which others are formed. As previously discussed, the wall system 10 utilizes flat-stacked stones which do not utilize mortar between joints. Prior art systems utilize mortar to fill gaps in both the horizontal and vertical directions. One problem with such vertically extending mortar is that dimensional inaccuracies become skewed across the width of a wall because the mortar widths may vary and those width variations accumulate across an entire width of a wall. Additionally, natural and existing man-made stones are not accurate dimensionally and mortar is used horizontally to compensate for the imprecise nature of these stone sizes in order to level a row of stones. With respect to the instant system, the accuracy of the stone dimensions results in a lack of need to fill gaps and compensate with mortar between stones. Additionally, when forming the wall 10, the preclusion of gaps makes easy the sizing of stones in order to form a wall with aligned edges since installers do not have to compensate for the thickness or width of the mortar. Due to the standard size, pattern and ninety degrees (90°) corners of each stone, the stones fit together snugly thus eliminating gaps that would otherwise reveal the supporting wall. Therefore no grouting is required to complete the finished appearance.

Additionally, since the height H and width W utilize a base number or a multiple of that base number, the stones may be oriented so that a longest dimension is either vertical or horizontal in the pattern. This provides improved structural integrity and support, but also a desired seemingly disorderly and more natural appearing organization of the artificial lightweight stone wall 10.

The block 20 also includes a plurality of edges 22 which are defined by substantially perpendicular corners. Theses edges 22 extend in a depth direction. Each of the surfaces 24, adjacent to and defining the edges or corners 22, are smooth so that adjacent stones may be flushly abutted to minimize gaps there between. As previously indicated this eliminates the need for use of mortar between stones which is typically used to inhibit viewing of the substrate behind the stones. Additionally, the flush abutment of stones also precludes visibility of the substrate wall 12 behind the stone wall system 10. The depth of the stones may range from about ¼" inch to about 2¾" inches. More specifically, the depth may be about ⅜" to about 1½". These thicknesses are fairly consistent and vary only due to the contouring and texturing of the outer stone faces. The stone dimensions are all desired to have a tolerance of about +/−3/32".

The stone 20 also includes a front surface or natural face 26 which may be smooth or textured or may simulate the natural face of a stone. The surface 26 may also be flat or may have contouring variation in the in thickness, in addition to the texturing which may or may not be present. The variation in thickness provides a more natural stone-like appearance for the visible surface of the wall system 10.

Figure 3:
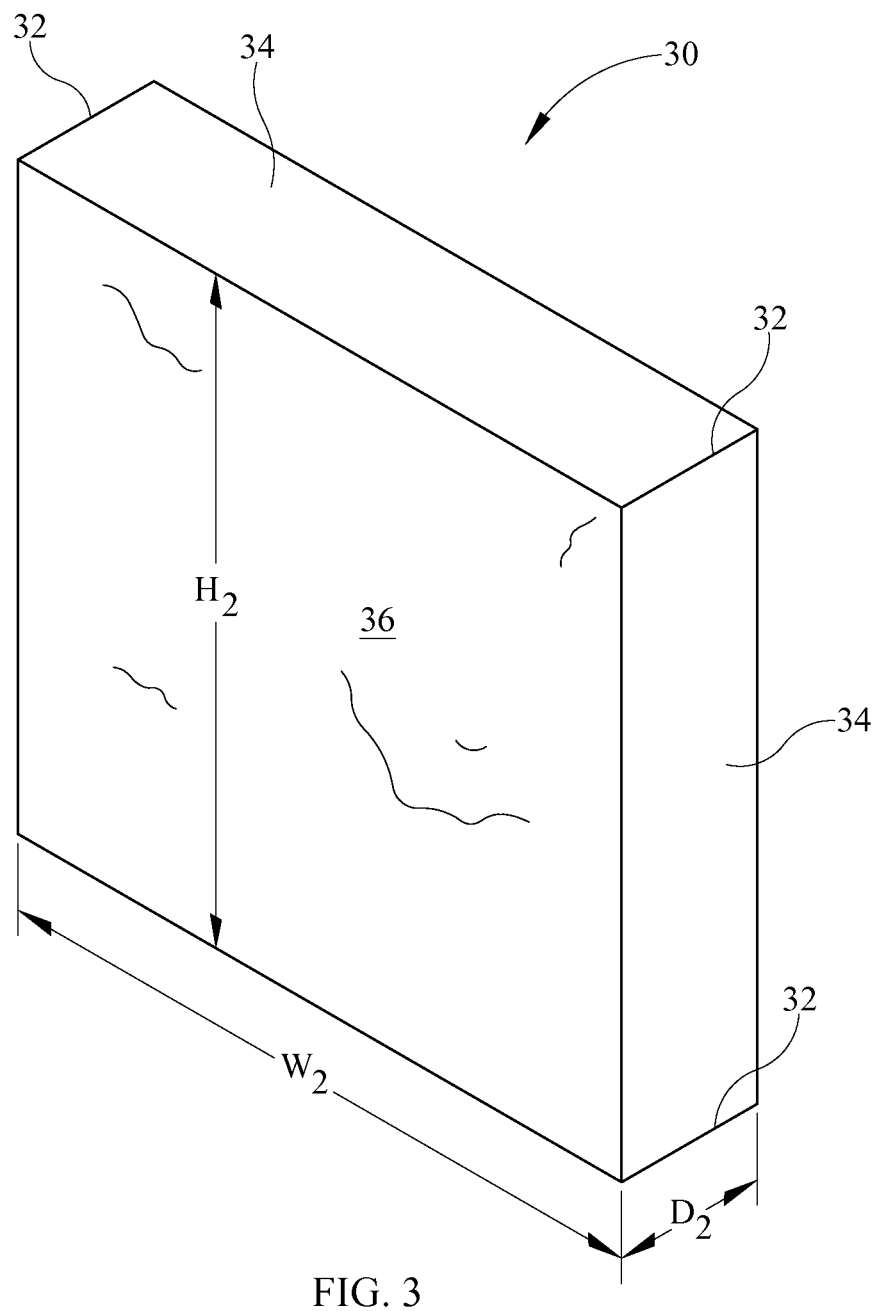
FIG. 3 is a perspective view of a second exemplary artificial lightweight stone.
Figure 4:
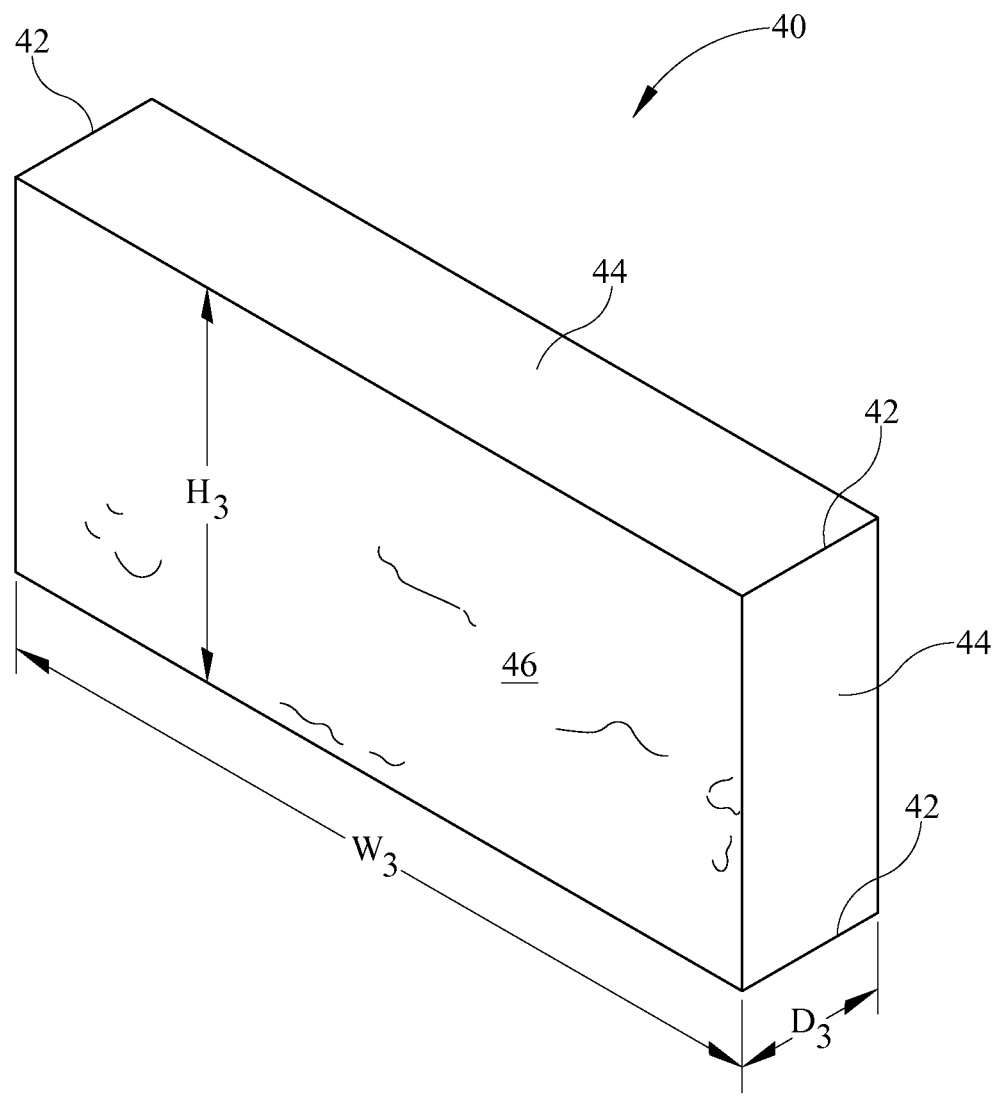
FIG. 4 is a perspective view of a third exemplary artificial lightweight stone.

Referring now to FIG. 3, an additional stone or block 30 is shown in perspective view. The stone 30 has a plurality of edges 32 defined by surfaces 34. The surfaces 34 are substantially smooth for abutting adjacent stones. The stone 30 further comprises a front surface 36 which may be smooth, textured or have a variable thickness in combination with the smooth or textured surface.

The edges 32 of the stone 30 are substantially perpendicularly formed and extend in the depth direction D. The substantially ninety degrees edges extending in the depth dimension aids in providing for a gapless or gap-free design.

The stone 30 also comprises a height dimension $H_2$, a width dimension $W_2$, and a depth dimension $D_2$. The width and the height dimensions are either a base number or a multiple of that base number as previously mentioned with stone 20. In this example, the height $H_2$ may be twice the height of $H_1$. Similarly, for example, the width $W_2$ may be substantially equal to or some multiple of $W_1$. Additionally, it should be noted that the stones may be rotated about an axis extending through surface 36 in the depth direction by about 90 degrees. In such configuration, the height dimension $H_2$ would become the width and the width $W_2$ would become the height. Such orientation may be utilized with the generally square shaped block 30 but also generally rectangular shaped stones, for example stones 20, 40.

The depth $D_2$ is generally equal to the depth $D_1$ and may be between about one-quarter (¼") inch and about two (2") inches. This range provides for a block size which provides a consistent depth along the front surface of the wall system 10 and may be supported along a wall surface.

Figure 5:
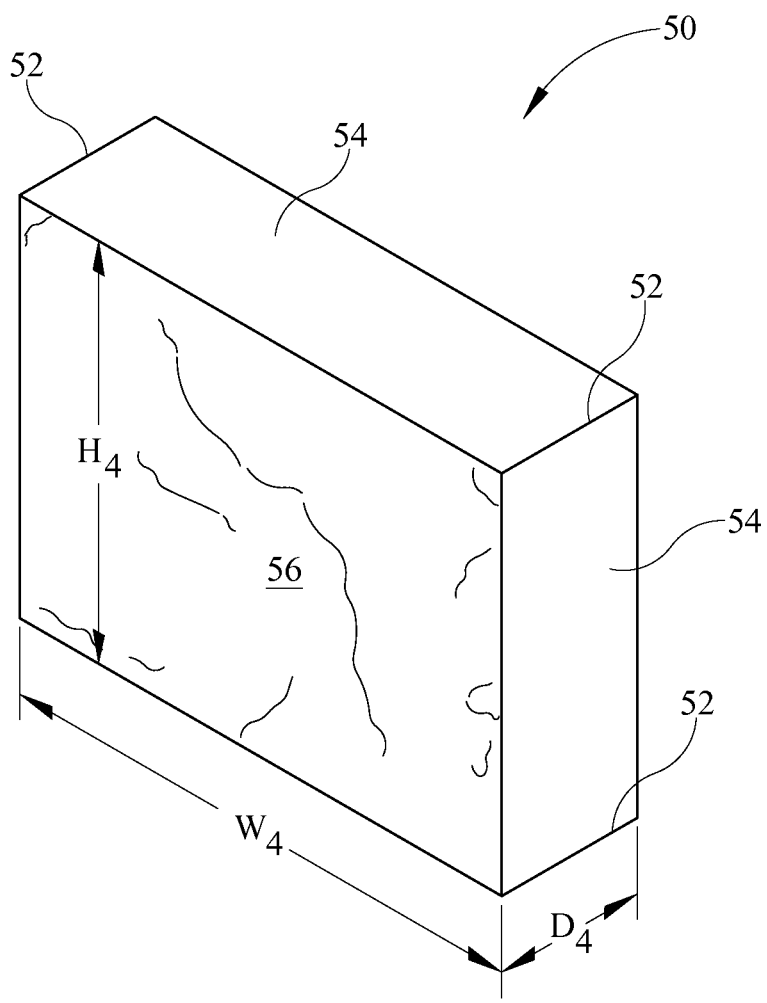
FIG. 5 is a perspective view of a fourth exemplary artificial lightweight stone.
Figure 6:
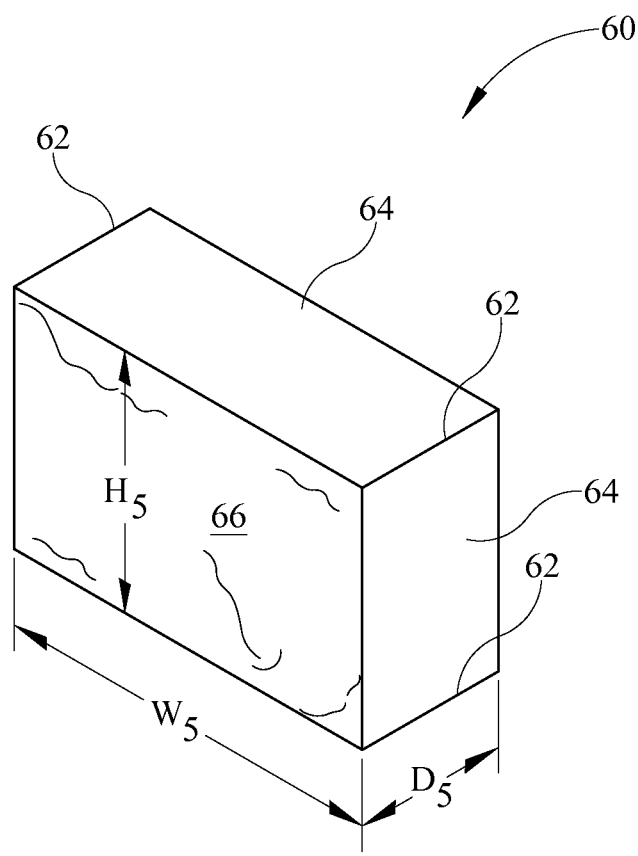
FIG. 6 is a fifth exemplary artificial lightweight stone.
Figure 7:
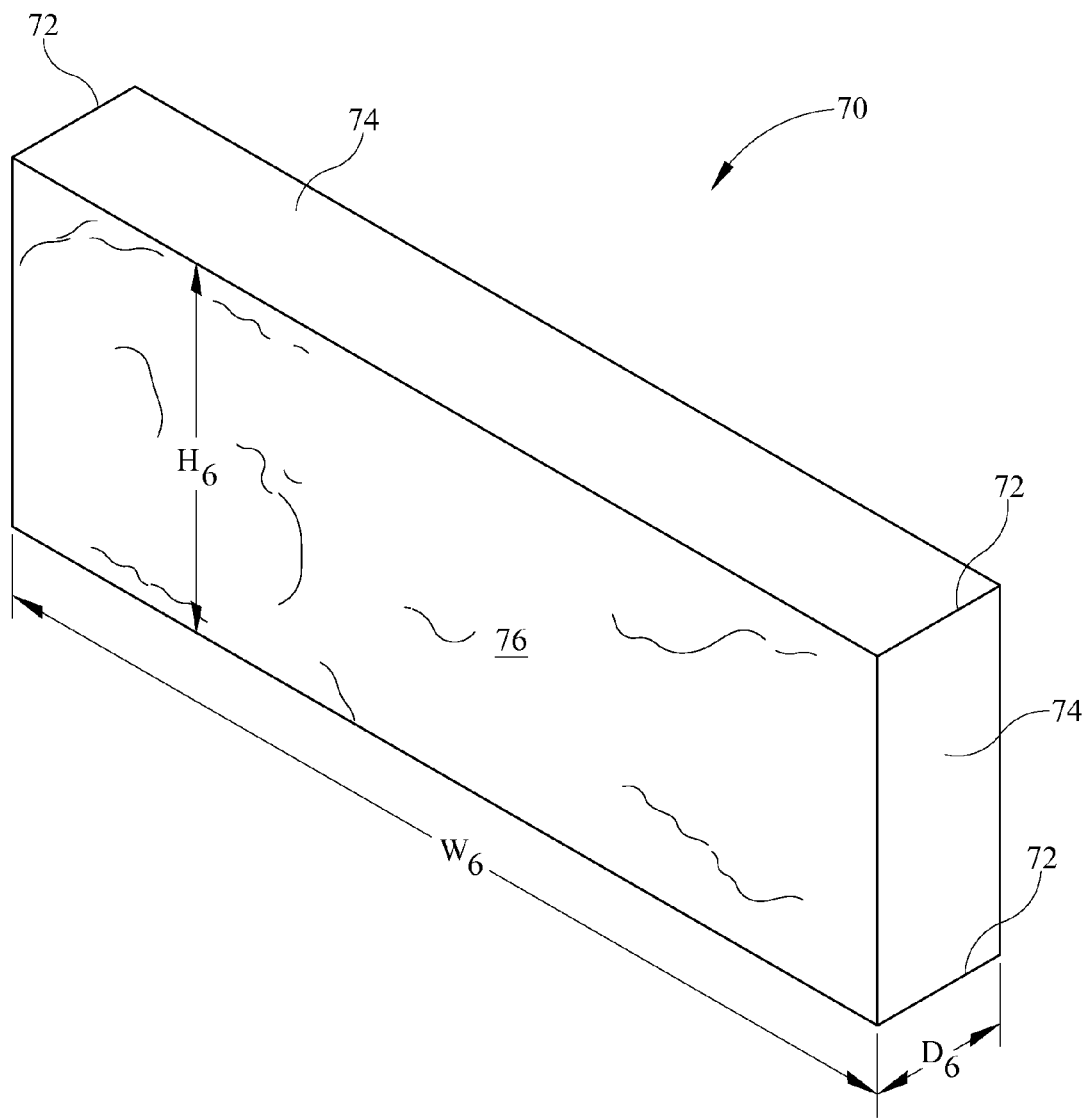
FIG. 7 is a sixth exemplary artificial lightweight stone.

As shown in FIGS. 4-7, various blocks are shown which may be utilized to form the stone wall 10. Block 40 includes an outer face 46 and a plurality of side surfaces 44. The side surfaces 44 are all smooth to allow positioning accuracy relative to adjacent stones. This, again, allows for ease of positioning stones without the use of mortar between stones while maintaining dimensional accuracy designed into the stones. The stone 40 is labeled with height ($H_3$), width ($W_3$) and depth ($D_3$) dimension labels. FIGS. 5-7 are shown and labeled similarity as described.

Figure 8:
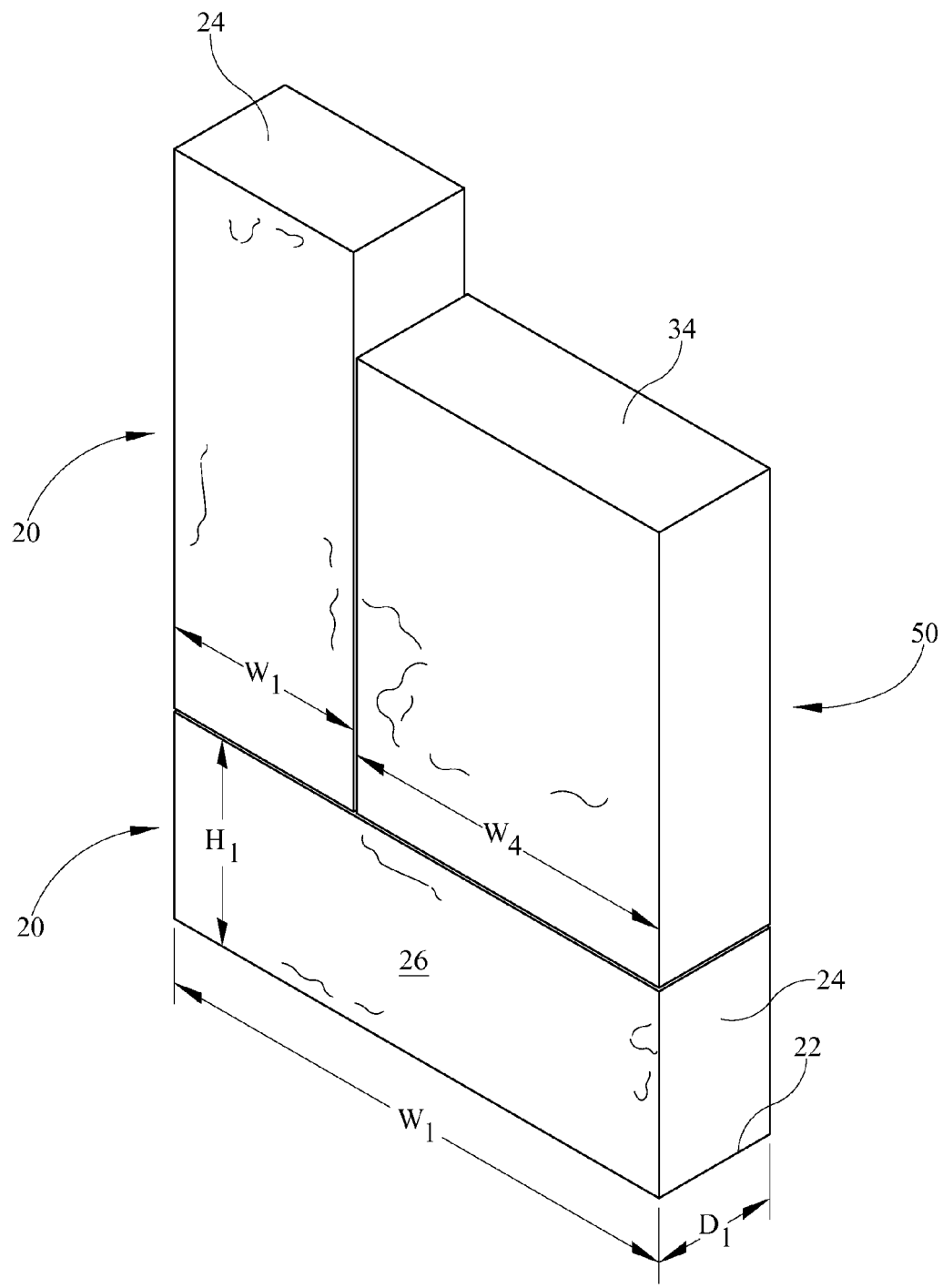
FIG. 8 is a perspective view of three stones to depict interrelationship of the dimensions of the artificial molded stones.

Referring now to FIG. 8, a small number of stones are shown and depict the rotational capability of the stones in the wall configuration without varying the alignment at ends of the wall. A vertically oriented stone 20 is disposed adjacent a stone 50. A horizontally oriented stone 20 is disposed beneath the stone 20 and stone 50. The vertically oriented stone 20 has a width ($W_1$) which is equal to the height ($H_1$) measurement of the stone horizontal 20. The horizontal stone 20 has a width measurement ($W_1$) which is greater than the width ($W_1$) of the vertical stone 20. According to the exemplary embodiment, the width ($W_1$) of the vertical stone 20 and the width ($W_4$) of stone 50 are equal to the width ($W_1$) of the horizontal stones 20. Any number of stones may be utilized across a distance dimension of a first stone. Alternatively stated, two or more stones such as vertically oriented stone 20 and stone 50 may be equal to the width or height dimension of, for example, horizontally oriented stone 20. This allows for edge alignment at wall ends and continuous construction, minimizing need to cut stone to customize the fit.

In order to provide the above relationship, that is a relationship in dimensions between stones, stones 20, 30, 40, 50, 60 and 70 may be formed with a base dimension. In the above example, the base dimension "x" may be two (2) units. For example, the width ($W_1$) of vertically oriented stone 20 may be four (4") inches. Accordingly, other stones may have dimensions which are some multiple of the base dimension "x". As shown in the exemplary FIG. 8, the width dimension ($W_1$) of the horizontal stones 20 may be mathematically expressed as 3x. Similarly, the width dimension ($W_4$) may be equal to 2x. Thus, the width of the wall segment shown may be expressed as x+2x. Due to the smooth surfaces of the stones and the lack of mortar between the stones, the ends of the wall remain aligned. Due to the molding procedure and tolerances used therewith, the tolerance for the finished block may only be about +/−3/32".

Figure 9:
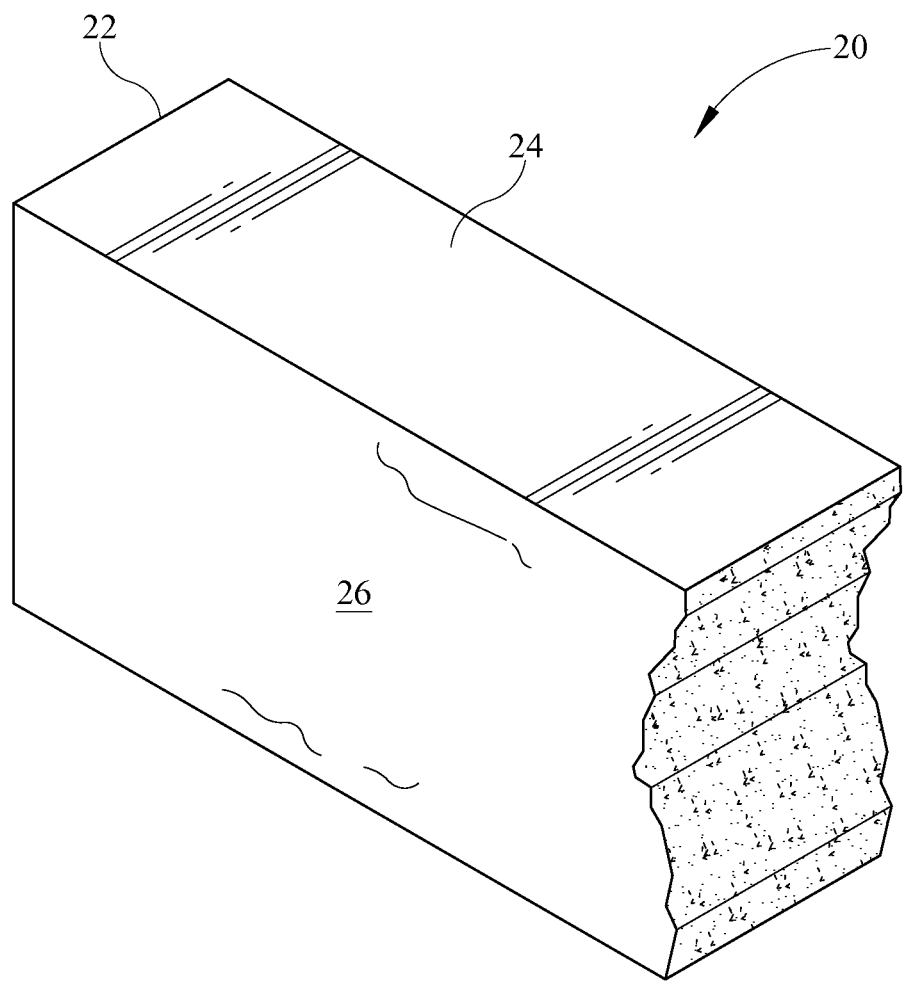
FIG. 9 is a perspective view of an exemplary artificial lightweight stone with a cut-away portion.

Referring to FIG. 9, a cut-away perspective view of an artificial block 20 is shown depicting the cement and at least one of styrene or expanded glass. The cut-away portion, indicated by jagged lines, is exemplary to depicted the interior portion and components of the exemplary block 20. However, as shown in other drawings, the boundaries of block 20 are straight.

Figure 11:
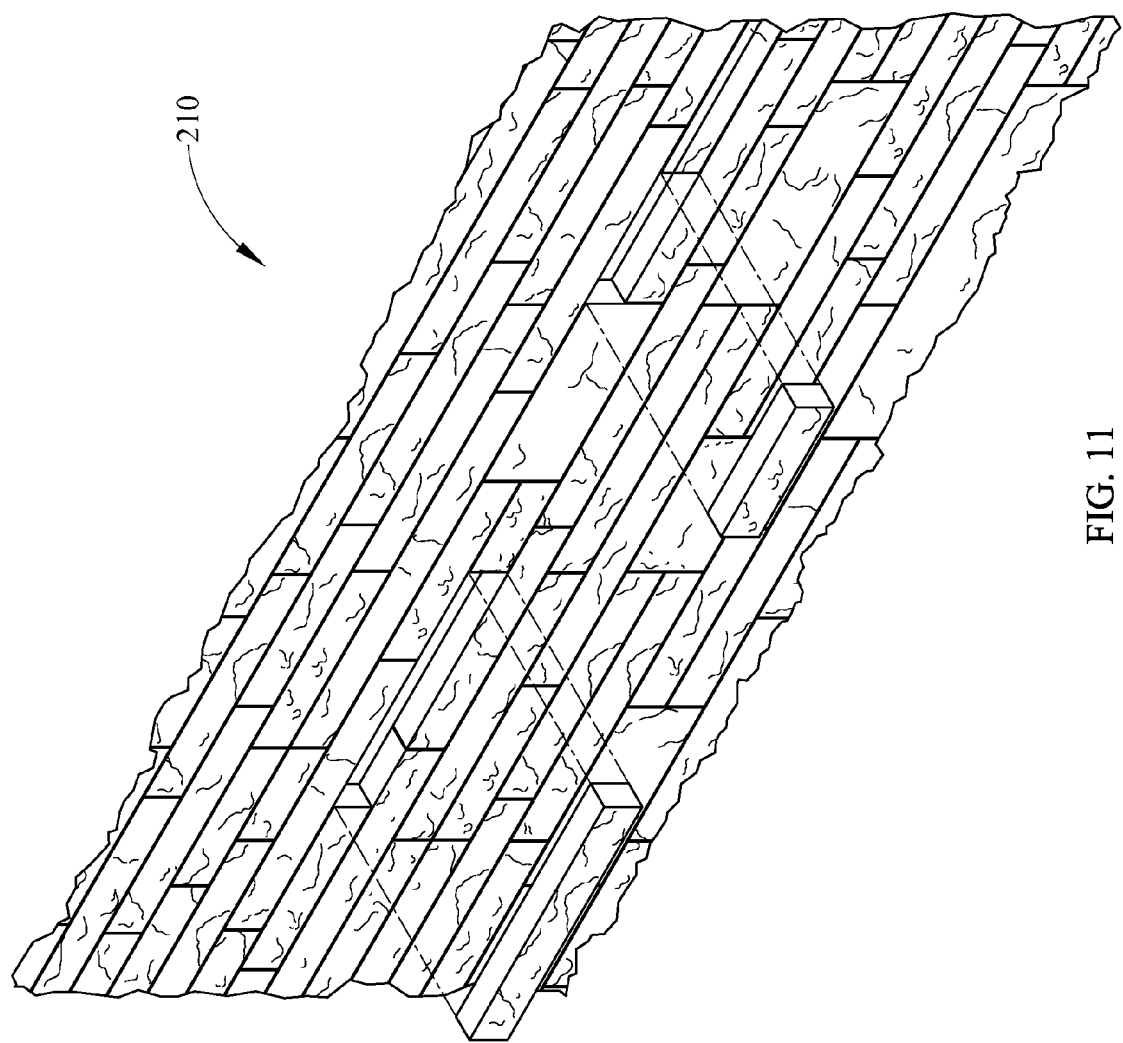
FIG. 11 is a perspective view of a second wall formed of artificial lightweight stone having alternative size dimensions.

Referring now to FIG. 11, an alternative stone veneer 210 is depicted. The veneer 210 is formed with stones having a base dimension of two inches (2") in height and width. The individual stones are all of rectangular shape having a long width dimension and a shorter height dimension, although a square shaped blocked could be utilized. As previously described, the stones are flat-stacked and have minimal tolerances so that the upper, lower, and vertical side surfaces are all engaging one another flush with a gap-less fit to inhibit view of the surface substrate behind the stones.

Figure 12:
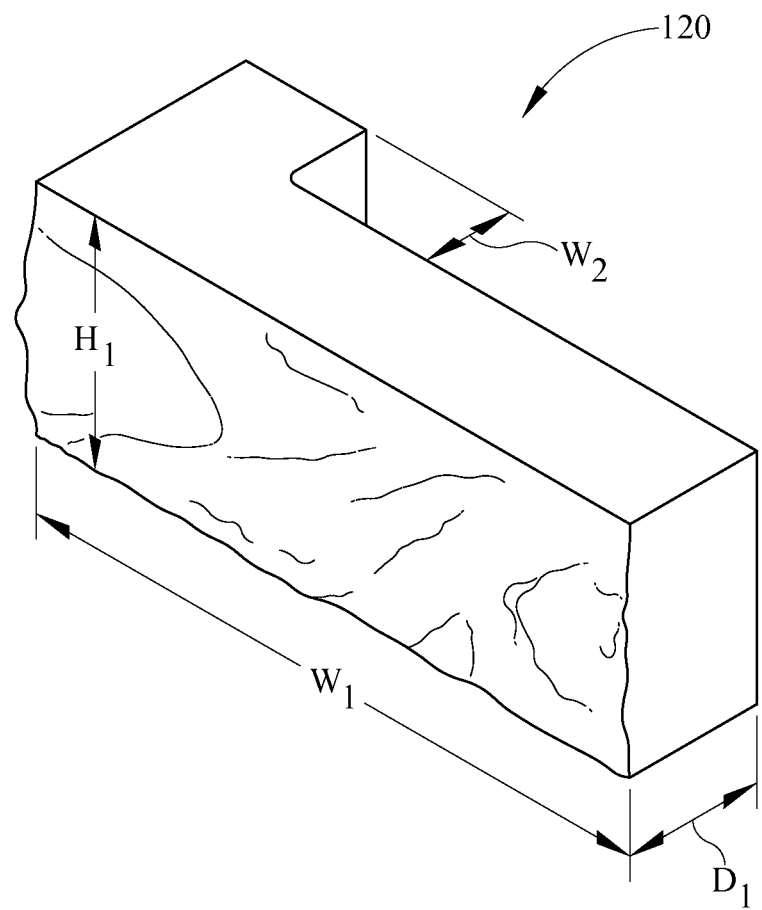
FIG. 12 is a perspective view of a corner block.

Referring briefly to FIG. 12, a perspective view of a further embodiment is depicted wherein a block 120 is depicted. The block 120 includes three dimensions width $W_1$, height $H_1$, and depth $D_1$. According to the instant example, the dimensions may be the same as the block in FIG. 2. Alternatively, the height and width dimensions may differ but the depth dimension will be substantially equivalent to the depth dimensions of blocks 20, 30, 40 50, 60 70, 80, 90 and 100. Additionally, the block 120 further comprises a second width dimension $W_2$ which extends a distance around the corner where the block is located.

Figure 10:
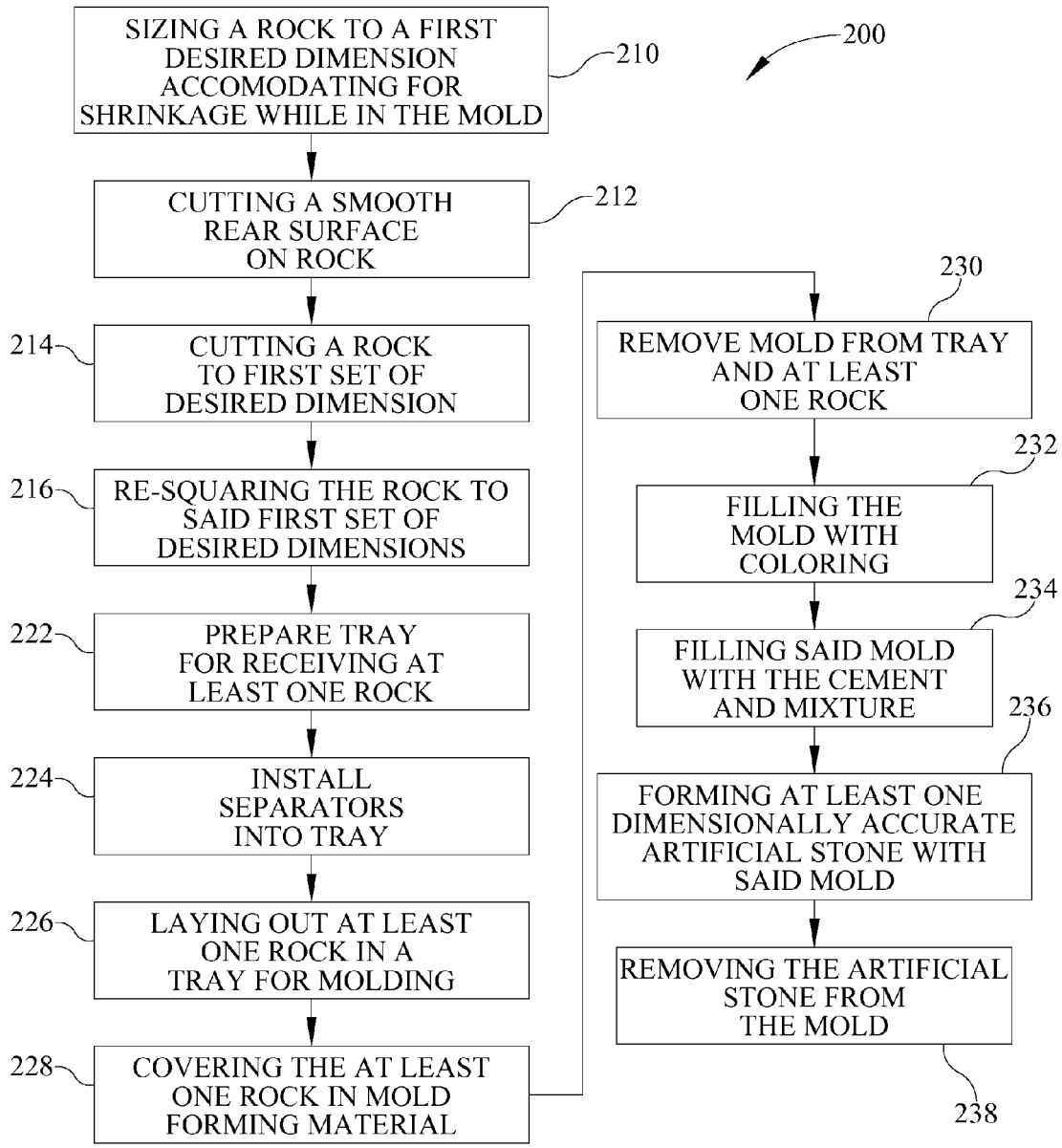
FIG. 10 is a flowchart for a first method of forming the artificial lightweight stone.

Referring now to FIG. 10, a method of producing the artificial lightweight block or stone 200 is depicted in the form of a flowchart. Initially at step 210, a natural stone or rock is sized such that an appropriate size for the stone and mold is determined. According to this embodiment, the rock is sized to produce an artificial stone of a desired size while accommodating for shrinkage of the cement mixture used to make the artificial stone. In accommodating for shrinkage, the natural rock must be slightly oversized to provide a larger mold size which will accommodate for the shrinkage since the natural stone is utilized to form the mold. The shrinkage may be in the range of between about 0.2% to about 3.0% and more specifically, about 0.4% and 2.0%. Next, at step 212, a rear surface of the stone is cut to a flat surface. This cutting as well as other cutting steps may be performed with a saw, water jet or other methods and devices known for cutting. Next, the rock is cut or squared to the first desired dimensions at step 214. This may be performed before, after or in between any of steps 212 through 218. In any event, the natural rock is re-squared to the first set of dimensions at step 216. The re-squaring step involves at least a diagonal measurement across the natural stone from corner to corner to ensure that the natural stone is truly square. If necessary, the stone may be cut to exacting measurements. However, this re-squaring step is not an absolute necessity and may be performed only if considered desirable. For example, it may be desirable to perform the re-squaring if the diagonal measurement across the stone cannot be ensured to be about or better than 3/32" (3/32 inch) with the first cutting step. Additionally, the corners of the rock, and artificial stones subsequently molded, are desired to be as close to 90 degrees as possible with a tolerance of less than 1 degree (1°). Thus the corners of the natural rock should be cut accordingly.

Once the natural stone has been re-squared at step 216, a tray for forming the mold is prepared at step 222. The at least one stone is subsequently placed in a tray, container or such structure for forming a mold. The tray or container may be formed of a metallic frame or the like at step 222 with spaces for the re-squared stones. At step 224, one or more separators are positioned in the frame. Alternatively, the separators may be integrally formed with the tray or container. The master tray or container utilizes separators to provide stress relief at stress points in the mold at step 222. The relief allows for removal of the molded product, from the mold without damage to the artificial stones, which may easily break due to the size and makeup of the material mixture. Specifically, the separators allow for flexing of the mold in the area where the separators are located easing the process of removing the artificial stone from the mold. Additionally, the flexibility provided by the separators allows for decreased cooling time required before the stones are removed from the mold without damaging the artificial stone. Such relief may comprise various structures but may include a thin piece of metal or the like.

One or more numbers of stones may be layed out at step 226 within a master tray structure so that at least one stone mold may be formed. Once the at least one stone is placed in the master tray or container, the at least one stone is covered with a mold forming material at step 228. For example, the mold forming material may be formed of rubber, vinyl, latex, elastomerics or other known materials suitable for molding products. The material which is in a liquid state is poured over the stone, and then air cools to a hardened state. Alternatively, the material may be sprayed over the stone, in one or more layers until desired thickness of material is reached, and then air cools. Once the mold is formed, the mold is removed from the tray and rocks at step 230.

Once the mold is formed, the stones may be formed. First, the mold may also be filled with coloring material or pigment at step 232, if desirable, to provide a suitable finish color to the artificial stone. Next, the artificial stone material mixture is positioned in the mold to form the artificial stone at step 234. The mixture is formed of at least cement and at least one of styrene or expanded glass.

Next, the mixture is cured to form at least one dimensionally accurate artificial stone with the mold at step 236. Once the at least one artificial stone is formed, it is removed at step 238. When the stone is removed it may be measured to confirm the dimensions are accurate after shrinkage of the material in the mold.

Figure 13:
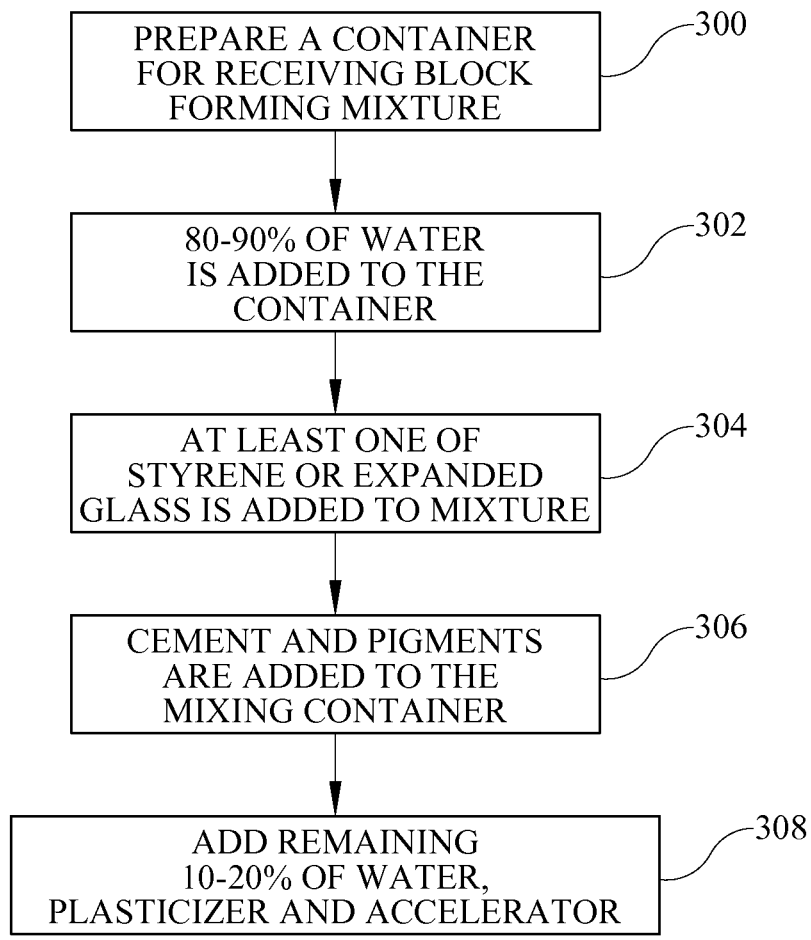
FIG. 13 is a flow chart depicting a method of forming the mixture used to make the artificial stones; and, FIG. 14 is a flow chart for a second method of forming the artificial lightweight stone.

Referring now to FIG. 13, the method of producing a stone for a wall system also includes preparing a rock forming material or the mixture to form the artificial stone. The mixture may be formed in a container at any stage of the process prior to the filling of the mold with the mixture at step 234. First, at step 300, a container is prepared for receiving the mixture. Next, about 70-90% of the water may be added to the container at step 302. Subsequently, at least one of polystyrene (PS), expanded polystyrene (EPS) or expanded glass is added to the container at step 304. The styrene, for example, should be ground to a size which is suitable for the instant function. The size of the styrene particles or beads may be in the range of about 0.15 mm-4.0 mm. Alternatively, or in addition, the expanded glass, for example, may be a granular size which is suitable for the instant function. The size of the expanded glass beads may be in the range of 0.25 mm-6 mm diameter for spherical shapes. Next, at step 306, the cement and pigment are mixed and then added to the mixing container. Additionally, the remaining 10-30% of water is added to the container as well as the plasticizer and accelerator at step 308. These percentages of water utilized at different times in the process of forming the mixture are merely exemplary and should not be considered limiting. One skilled in the art will realize that once the container is available, the above listed components may be added in different orders and is not limited to the specific order recited. Upon mixing of the various components, the mixture may be added to a mold at step 234.

According to a first example, the mixture may include styrene alone, that is without the use of expanded glass.

EXAMPLE I

|  | % by volume | % by weight |
| --- | --- | --- |
| cement | 24 | 86.6 |
| styrene | 73 | 5.5 |
| plasticizer | <1 | <1 |
| accelerator | <1 | <1 |
| aggregate | 2.7 | 6.9 |
| pigments | <1 | <1 |

According to a second example, the mixture may include both expanded glass and styrene.

EXAMPLE II

|  | % by volume | % by weight |
| --- | --- | --- |
| cement | 26 | 66 |
| expanded glass | 52 | 32 |
| plasticizer | <1 | <1 |
| styrene | 21 | 1 |
| accelerator | <1 | <1 |
| pigments | <1 | <1 |

As previously described, the expanded glass may be in various forms including spherical. For example the expanded glass may be sized according to the following diameter size ranges: about 20% in the 0.25-0.5 mm; about 20% 0.5-1 mm; about 24% 1-2 mm; and about 35% 2-6 mm.

According to a third example, the mixture may include expanded glass alone, without styrene.

EXAMPLE III

|  | % by volume | % by weight |
| --- | --- | --- |
| cement | 32.9 | 66 |
| expanded glass | 67 | 33 |
| plasticizer | <1 | <1 |
| accelerator | <1 | <1 |
| pigments | <1 | <1 |

In any of the examples, the percentage by weight of the finished stones may be as follows: cement may be in the range of between about 60-90%, expanded glass may be between about 20-39%, styrene may be less than about 5%, plasticizer may be less than about 5%, accelerator may be less than about 5% and pigment may be less than about 5%. Once the mixture is molded into an artificial stone, the artificial stones may have a density in the range of between about 15 lbs./cubic foot and 70 lbs./cubic foot. More preferably the stones may have a molded density of between about 30 lbs./cubic foot and 45 lbs./cubic foot. The low density of the formed stones allows for placement of the stones on a wall without the necessity of lath or mortar, which is common in heavier natural or man-made stones. The lack of needing lath or mortar allows the stone to be placed directly on drywall or other lightweight or low strength surfaces. Additionally, the stones may be installed by those with less experience such as do-it-yourselfers and without all of the normal tools required for installation requiring mortar or lath. Furthermore, the lightweight of the stones allows for placement of the stone on a vertical surface using a non-cement based adhesive or a pre-mixed adhesive, without the need for bracing the stone to prevent sliding or falling off of the wall prior to setting.

Figure 14:
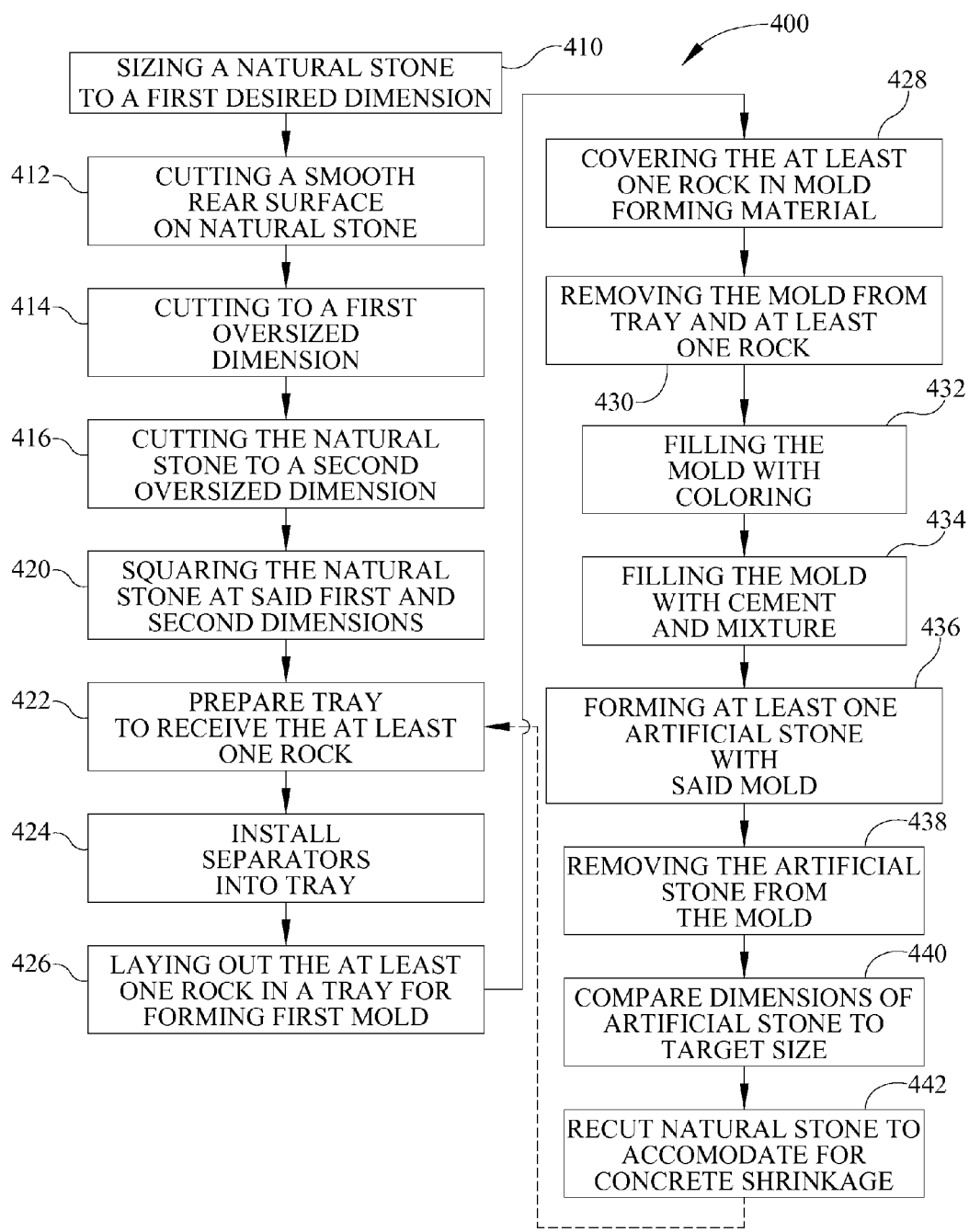

Referring now to FIG. 14, a the flow chart of an additional method embodiment is depicted. The method 400 requires sizing a natural stone to a first desired dimension at step 410. Next, a smooth rear surface is cut on the natural stone at step 412. Next, the natural stone is cut to a first oversized dimension at step 414. This cutting may occur with a saw, water jet or other cutting device or process.

Next, the natural stone is cut to a second oversized dimension at step 416. These first and second dimensions may be any or all of the width, height or depth of the stone. After, the natural stone or rock is squared to the first and second desired dimensions at step 420. Subsequently, a tray is prepared to receive at least one rock at step 422. Separators may be installed into the tray at step 224 or alternatively may be integrally formed with the tray, which is prepared at step 222.

Next at least one rock is laid out in the tray for forming a first mold at step 426. After the at least one rock is laid out, the at least one rock is covered in mold-forming material at step 428. As previously described, the mold is removed from the tray and the at least one rock at step 430 and the mold may or may not be filled with coloring at step 432. Addition of colloring may only be desirable or necessary when forming the artificial stones for manufacture. Next, the mold is filled with the cement and mixture at step 434 and at least one artificial stone is formed with the mold at step 436. Finally, the artificial stone is removed from the mold at step 438. At this point, the artificial stone is measured to compare its dimensions to a target size at step 440.

If the target size of the artificial stone differs from the actual dimensions of the artificial stone, then the natural stone must be cut to product a mold which, in turn, will produce an artificial stone of desirable dimensions. For example, a target dimension of eight inches (8") may be desirable but the actual dimension of the artificial stones results in eight and one-half inches (8½") after shrinkage of the concrete. According to the exemplary description, when the actual dimension does not match the target size, the natural stone or rock is re-cut at step 442 to accommodate for the concrete shrinkage which occurred in the forming of the first artificial stone so that a second mold is formed at step 422 by preparing a tray to receive at least one rock. Next, at step 424, separators may be installed into the tray. After the tray is prepared, at least one rock may be laid out in the tray for molding at step 426 and the at least one rock is covered by a molding material at step 428. After the mold is removed from the tray and the at least one rock at step 430, the mold may be filled with coloring at step 232 and the mold filled with the cement and mixture at step 434.

A second artificial stone is formed at step 436 and removed from the mold at step 438. Next, the second artificial stone dimensions are compared to the target size at step 440 and the natural stone may be re-cut to accommodate more concrete shrinkage at step 442. If the second artificial stone is not dimensionally accurate at step 440, the natural stone is re-cut and the process begins again at step 422 by preparing a tray and forming a third mold and artificial stone until the resultant size of the artificial stone is dimensionally accurate. Once the artificial stone is dimensionally accurate, then the mold size is correct and may be utilized for subsequent manufacture of artificial stones.

The difference in the first and second methods being that according to the first method 200, the dimensional accuracy of the at least one artificial rock is determined at the beginning of the process. However, in the second process 400, the dimensional accuracy is obtained by forming artificial stones and adjusting the dimensions of the natural rock until an artificial stone which is dimensionally accurate may be formed. As a result, that mold may be used for subsequent manufacture.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. An artificial stone, comprising:
a lightweight molded stone having an appearance of a natural rock on at least one surface;
said lightweight molded stone being capable of being positioned on a low strength surface;
said molded stone having a substantially sand-free consistent mixture of:
cement being between about 60-90% by weight;
expanded glass being about 20-39% by weight;
said expanded glass being a plurality of beads generally spherical in shape, said beads having diameter size ranges of: about 10-30% being about 0.25-0.5 mm in diameter; about 10-30% being about 0.5-1 mm in diameter, about 14-34% being about 1-2 mm in diameter, and about 25-45% being about 2-6 mm in diameter.

2. The artificial stone of claim 1 further comprising a plasticizer being less than about 5% by weight.

3. The artificial stone of claim 1 further comprising an accelerator being less than about 5% by weight.

4. The artificial stone of claim 1 further comprising styrene.

5. The artificial stone of claim 1, said styrene being less than about 5% by weight.

6. The artificial stone of claim 1 further comprising pigments.

7. The artificial stone of claim 6, said pigments being less than 1% by weight.

* * * * *